M. W. WIARD.
Eye-Glass for Watchmakers.

No. 165,904.  Patented July 20, 1875.

Witnesses
W. L. Bennem.
W. H. Isaacs.

Inventor
Myron Willard Wiard
by his atty.
E. S. Renwick

UNITED STATES PATENT OFFICE.

MYRON W. WIARD, OF WAUKEGAN, ILLINOIS, ASSIGNOR TO HIMSELF AND CHARLES F. WIARD, OF SAME PLACE.

IMPROVEMENT IN EYEGLASSES FOR WATCHMAKERS.

Specification forming part of Letters Patent No. 165,904, dated July 20, 1875; application filed June 30, 1875.

*To all whom it may concern:*

Be it known that I, MYRON WILLARD WIARD, of Waukegan, in the county of Lake and State of Illinois, have made an invention of a new and useful Adjustable Eyeglass for Watchmakers' Use, and for other purposes; and that the following is a full, clear, and exact description and specification of the same.

The eyeglass generally used by watchmakers consists of a short flaring tube, fitted at its smaller end with a magnifying glass or lens. The flaring end of the tube is rigid, and is held to the face of the user by being forced in between the fleshy part of the eyebrow and the cheek-bone. As the users vary in size, a size of tube must be selected most nearly suited to the peculiarities of each individual, and considerable difficulty is frequently experienced in holding the eyeglass in its place. In order to obviate the defects of the old rigid eyeglass, I have invented an eyeglass with an expanding rim, which adjusts itself to the peculiarities of the user, or may be adjusted to such peculiarities; and, in order that my invention may be fully understood, I have represented in the accompanying drawings, and will proceed to describe, an adjustable eyeglass, embodying my invention in the best form which I have thus far devised.

Figure 1:
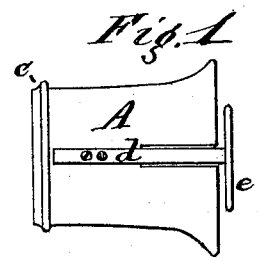
Figure 2:
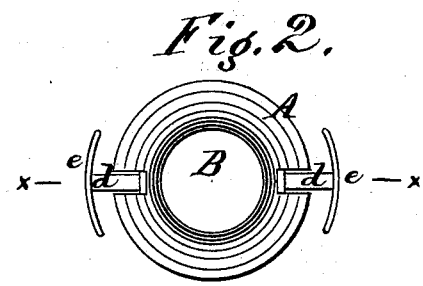
Figure 3:
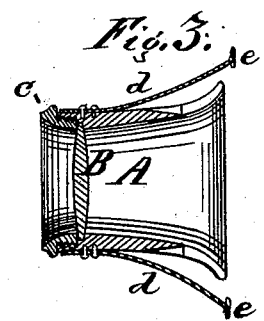

Figure 1 of said drawings represents a side view of said eyeglass. Fig. 2 represents an end view of the same. Fig. 3 represents a central longitudinal section of the same, at the line $x\ x$ of Fig. 2.

The eye-tube A of said eyeglass is of the customary flaring form, and is made of horn or of vulcanite. At the smaller end of it is the lens B, which is secured in place by a screw-ring, $c$. The larger end of the tube, which is intended to fit to the face of the user, is slotted longitudinally at its opposite sides, and two springs, $d\ d$, are secured to the tube so as to play in said slots. The free end of each spring is fitted with a segment of a ring, $e$, and the springs are so set as to cause the ring-segments at opposite sides of the tube to diverge. The ring-segments $e$, thus combined with the tube, constitute an expanding rim for the eye-tube, which adapts the eyeglass to the peculiarities of users having faces of different sizes and forms. When the eyeglass is to be applied to the face of the user, the expanding rim is contracted by pinching the springs between the finger and thumb. Then the eyeglass is pressed against the face, and the pressure of the finger and thumb upon the springs is relaxed, thus permitting them to expand the rim, and cause the expanding rim to fit the face. As the extent to which the rim expands is determined by peculiarities of the face of the user, the eyeglass is self-adjusting. If deemed best, however, the springs may be replaced by hinged links, and the expanding rim may be moved outward (or expanded) and inward (or contracted) by means of a screw-ring, or screws operating upon said links, and may thus be adjusted to fit the peculiarities of the user, instead of being self-adjusting.

I claim as my invention—

1. The combination, substantially as before set forth, of the eye-tube and the expanding-rim thereof.

2. The combination, substantially as before set forth, of the lens, the eye-tube, and the expanding rim of said tube.

Witness my hand this 15th day of June, A. D. 1875.

MYRON WILLARD WIARD.

Witnesses:
FRANCIS E. CLARKE,
OLIVER S. LINCOLN.